April 26, 1955  C. G. A. ROSEN ET AL  2,706,971
TWO CYCLE ENGINE
Filed Dec. 28, 1949  8 Sheets-Sheet 7
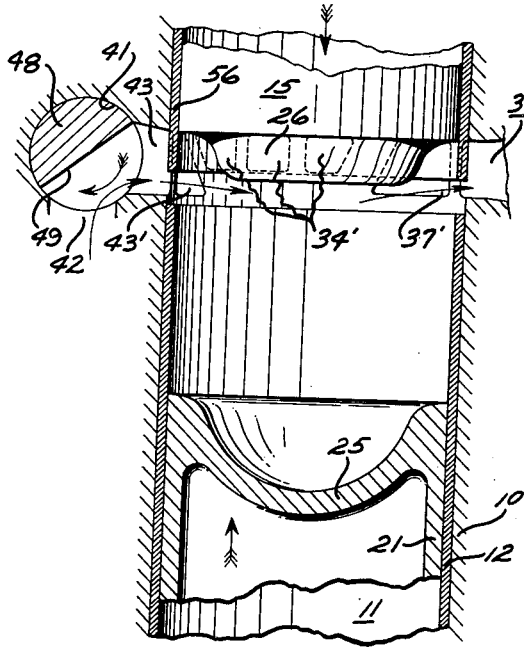
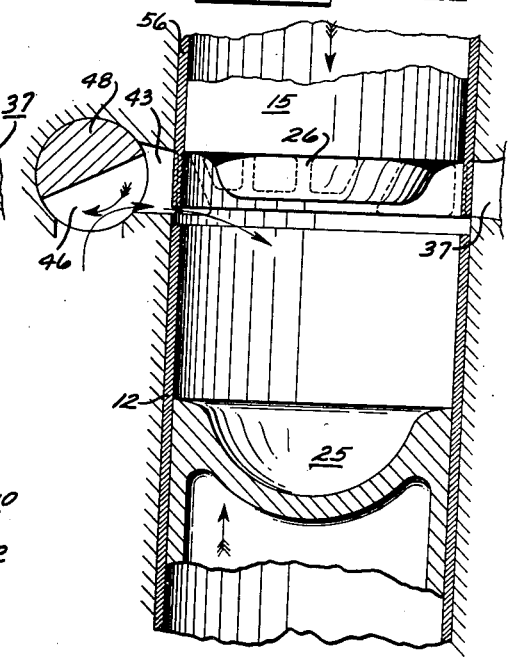
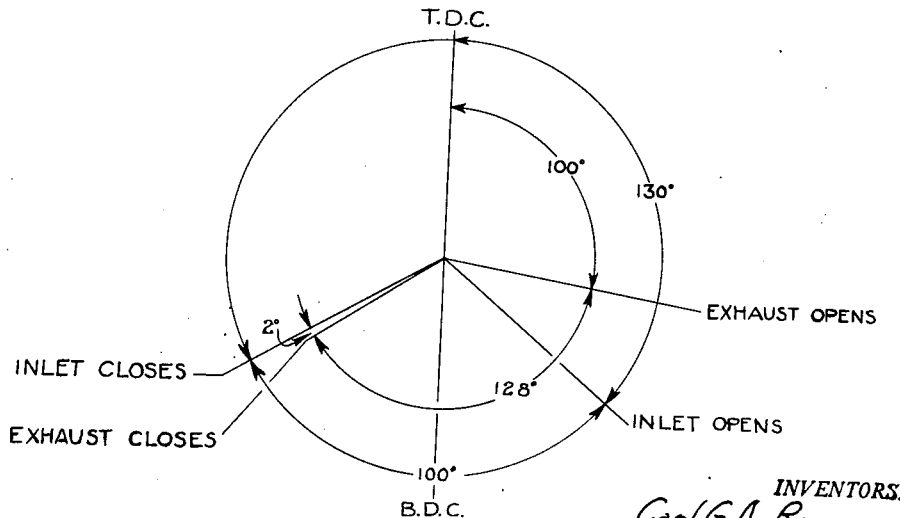
INVENTORS.
Carl G. A. Rosen
BY Lloyd E. Johnson
Charles M. Fryer
ATTORNEY.

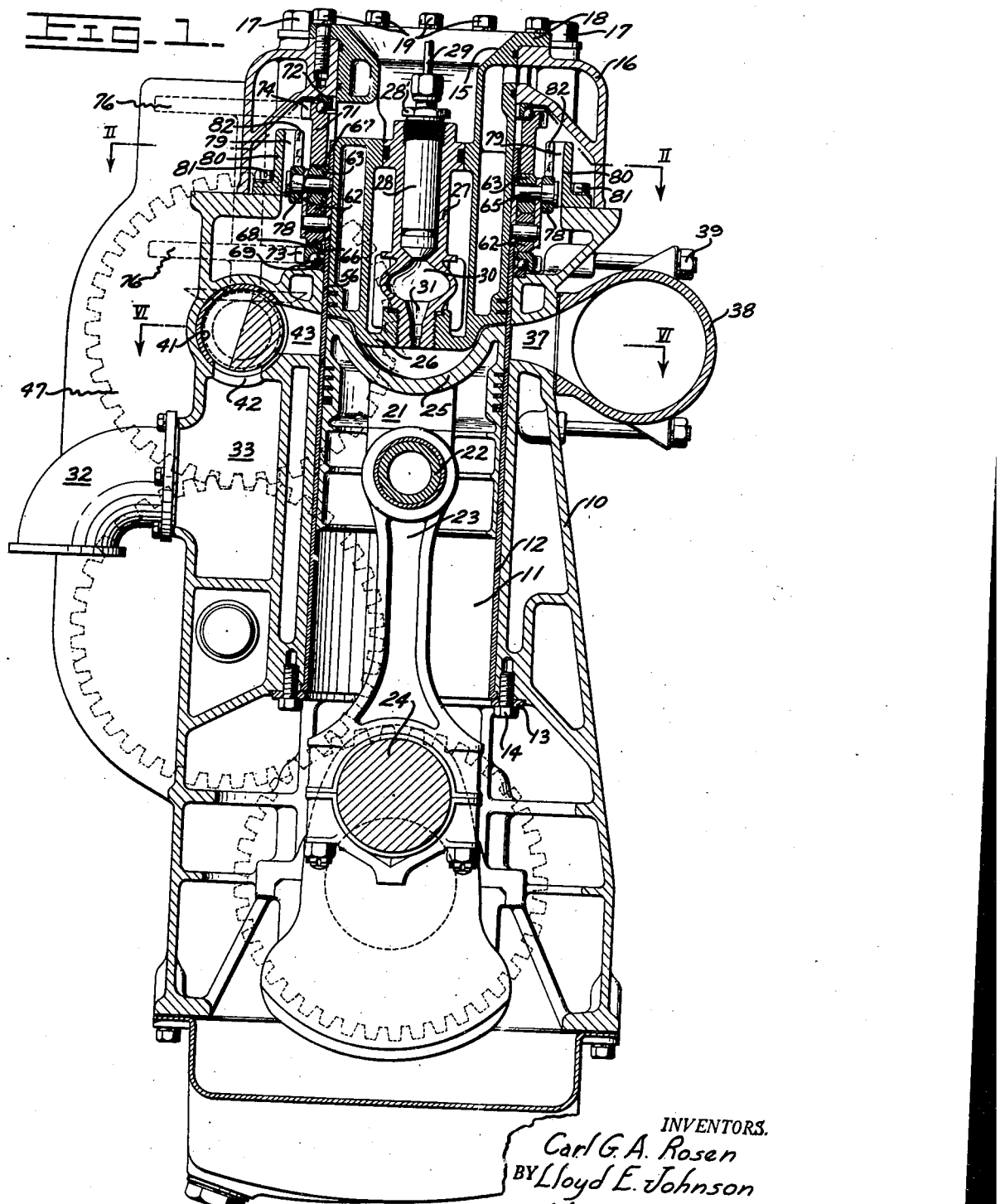

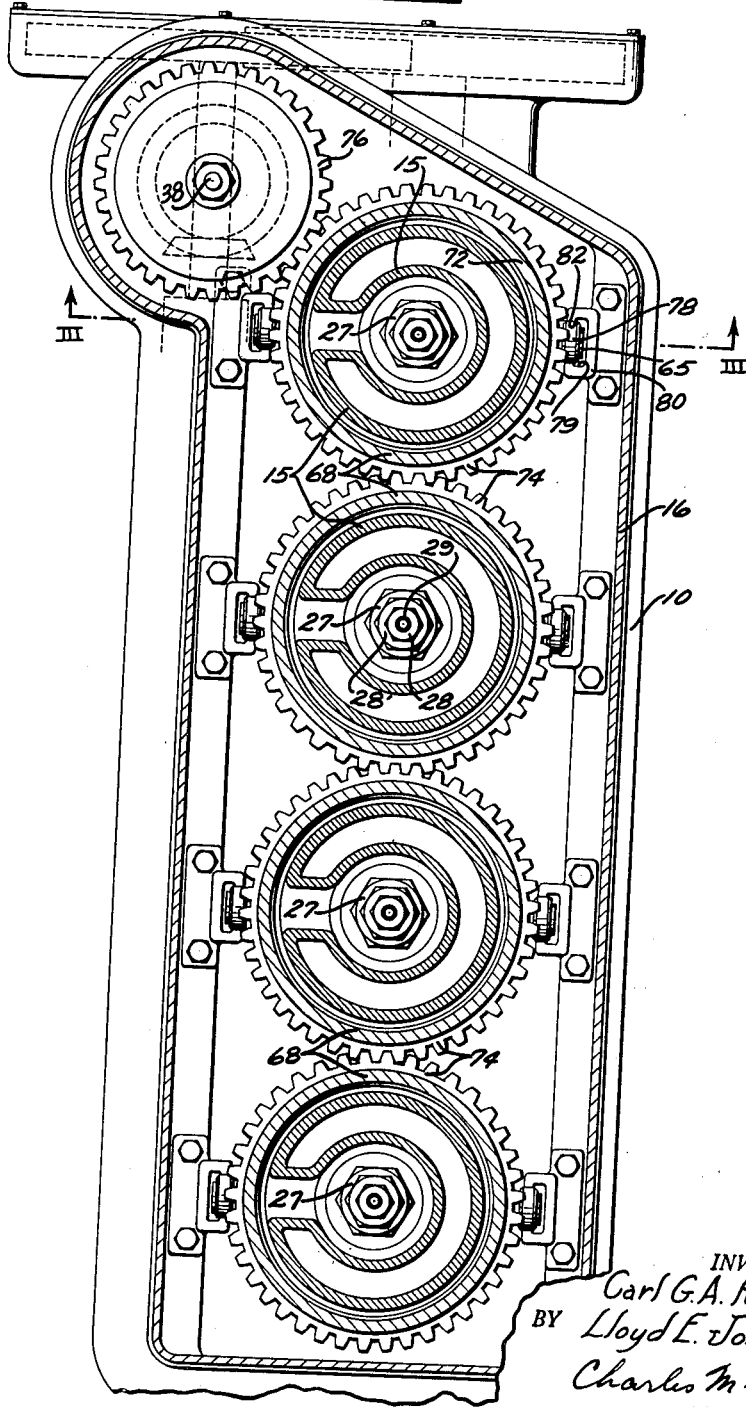

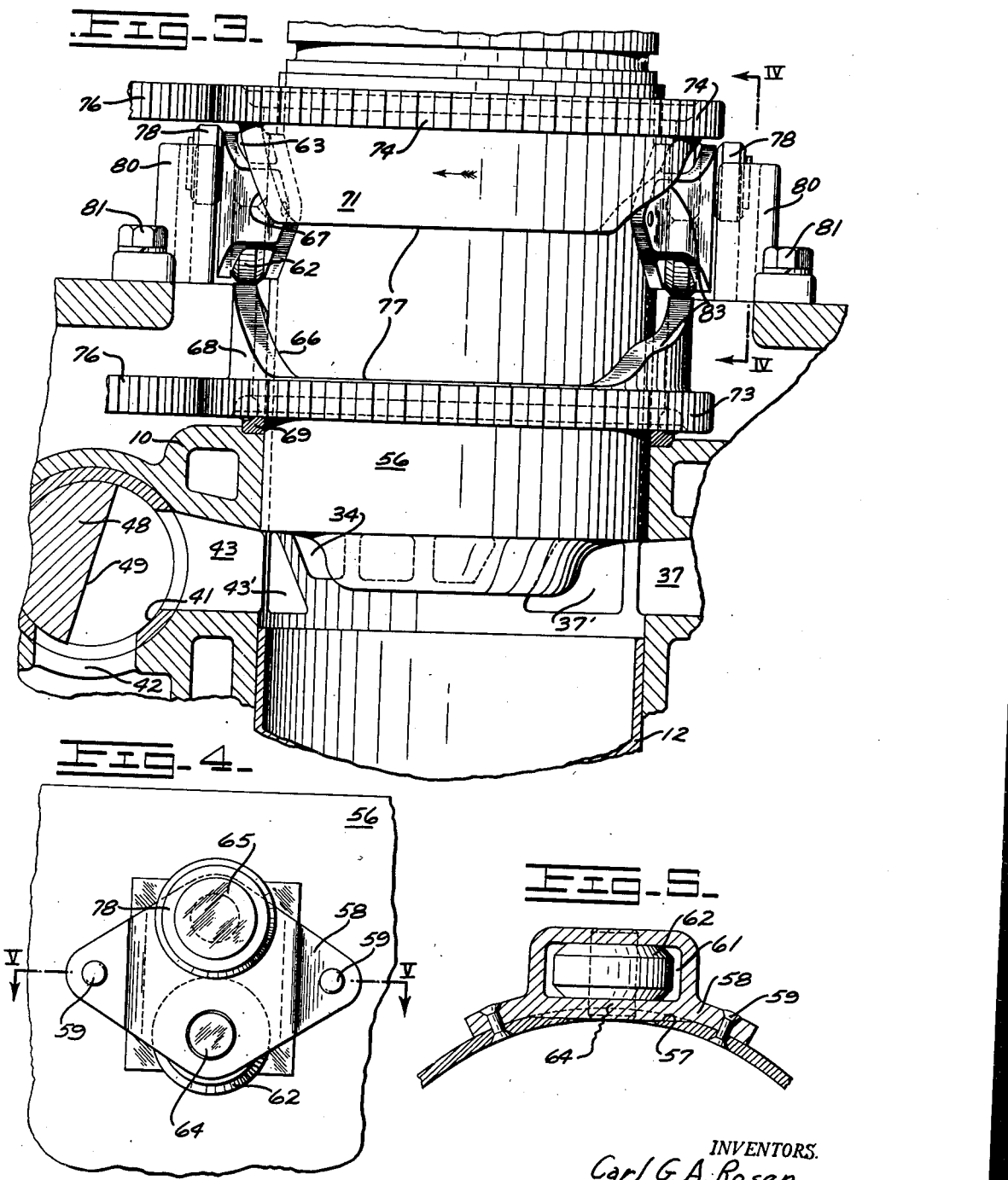

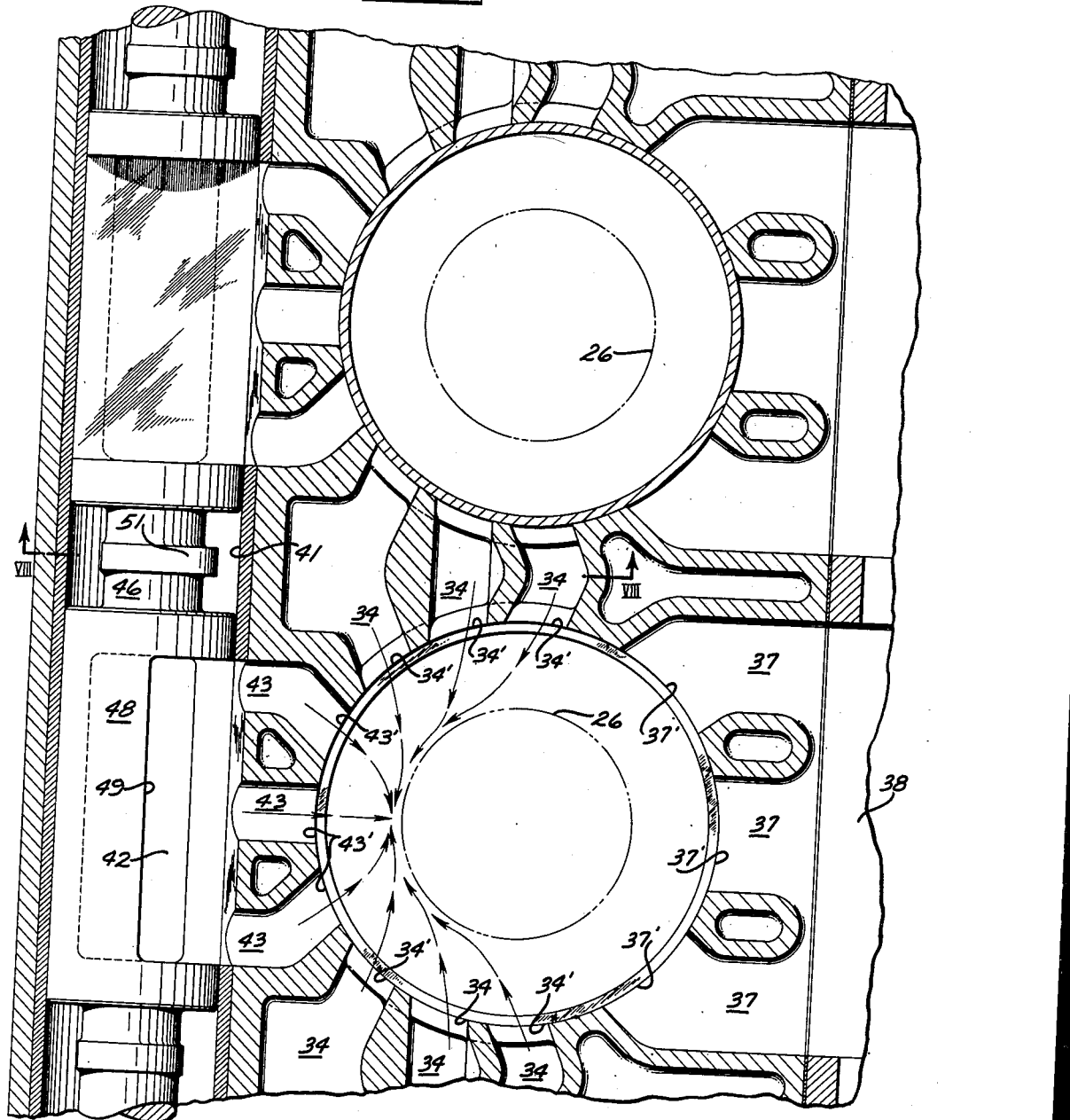

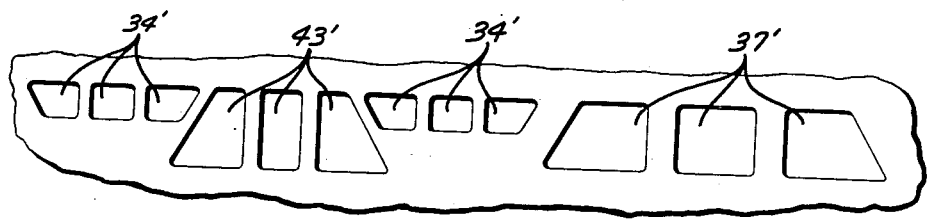
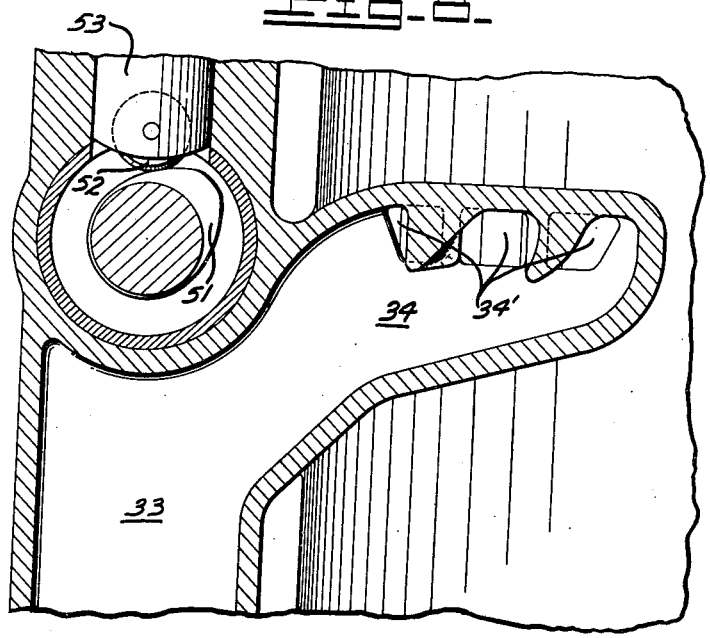

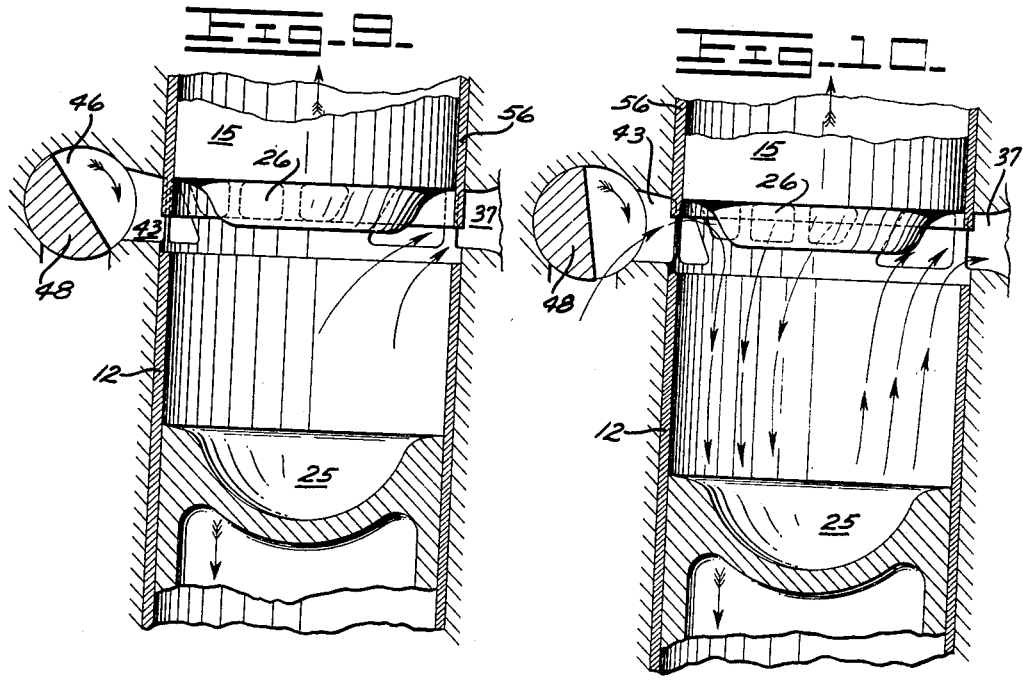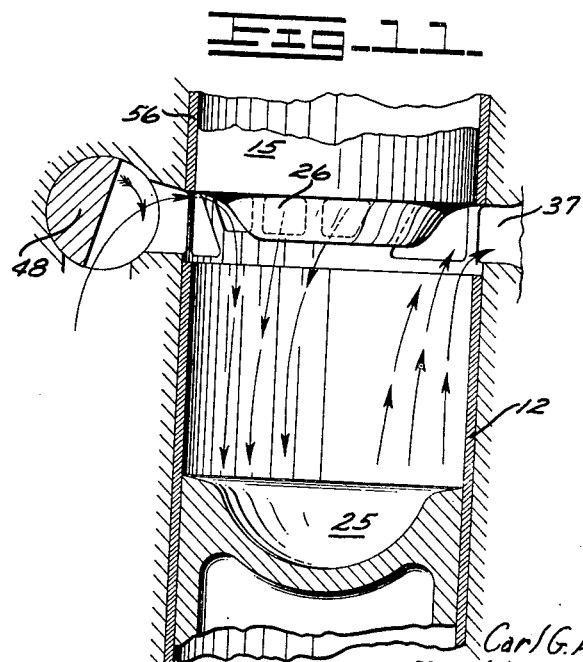

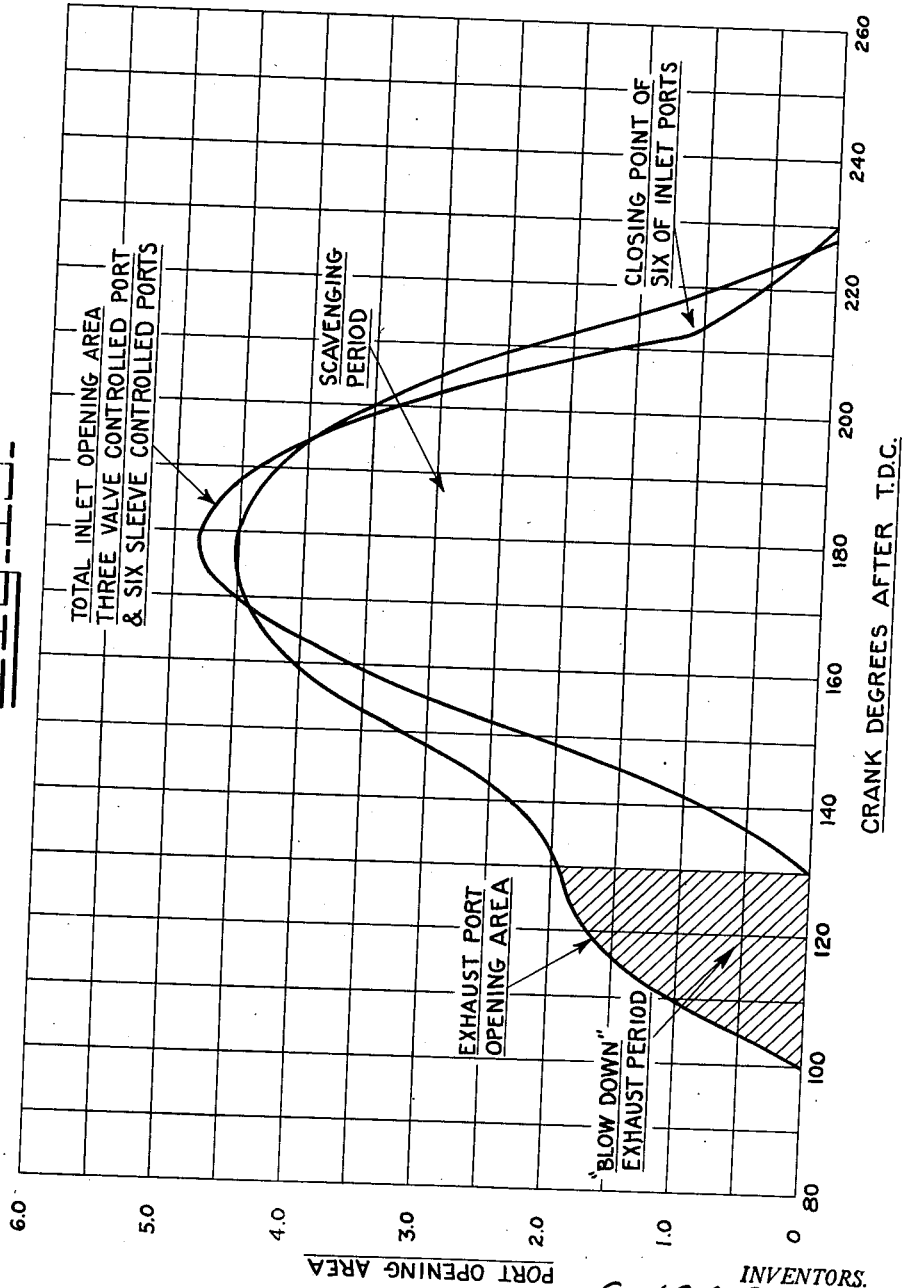

United States Patent Office 2,706,971
Patented Apr. 26, 1955

2,706,971
TWO CYCLE ENGINE

Carl G. A. Rosen and Lloyd E. Johnson, Peoria, Ill., assignors to Caterpillar Tractor Co., Peoria, Ill., a corporation of California Application December 28, 1949, Serial No. 135,438

1 Claim. (Cl. 123—65)

This invention relates to internal combustion engines in general and more particularly to two cycle internal combustion engines.

In a two cycle engine, one of the principal difficulties encountered is that of removing the exhaust gases from the engine cylinders and preventing intermixing of the incoming charge of fresh air with the exhaust gases. Numerous methods of admitting the incoming charge of fresh air and removing the exhaust gases have been utilized in the past in an effort to obtain better scavenging thereby increasing the efficiency of the engine, however, none have been entirely satisfactory.

It is, therefore, an object of the present invention to provide an engine having a novel disposition of inlet and outlet ports about the circumference of the cylinder to direct the scavenging air downwardly along the cylinder wall away from the exhaust ports and thence upwardly by loop flow toward the exhaust ports resulting in unusually efficient scavenging.

It is another object of this invention to provide a means for controlling the timing of the opening of the ports whereby a minimum of intermixing of the incoming air with the exhaust gases is obtained, as well as permitting the cylinder to be supercharged. Other objects and advantages of this invention will be made apparent in the following specification wherein reference is made to the accompanying drawings.

In the drawings:

Fig. 1 is a vertical sectional view through an engine incorporating the present invention;

Fig. 2 is a sectional view taken along line II—II of Fig. 1 illustrating a portion of the valve actuating train;

Fig. 3 is a fragmentary sectional view taken along line III—III of Fig. 2 illustrating the valve actuating mechanism and having parts shown in full elevation.

Fig. 4 is an enlarged fragmentary view taken along line IV—IV of Fig. 3;

Fig. 5 is a fragmentary sectional view taken along line V—V of Fig. 4 illustrating the construction of the cam roller carrier;

Fig. 6 is a fragmentary sectional view taken along line VI—VI of Fig. 1 illustrating the arrangement of the valve ports;

Fig. 7 is a development of a part of one of the engine cylinders illustrating the disposition of the valve ports in the cylinder wall;

Fig. 8 is a fragmentary sectional view taken along line VIII—VIII of Fig. 6;

Fig. 9 is a schematic sectional view of one of the engine cylinders and valve mechanism illustrating the relative position of the various parts during that portion of the engine cycle in which only the exhaust ports are open;

Fig. 10 is a similar sectional view illustrating the relative position of the various parts and the air flow during the early part of the scavenging period;

Fig. 11 is a similar sectional view illustrating a position of the various parts with the piston at bottom dead center in which both the inlet and exhaust ports are at their maximum open position;

Fig. 12 is a similar sectional view illustrating the relative position of the various parts near the end of the scavenging period;

Fig. 13 is a similar sectional view illustrating the relative position of the various parts during the charging period;

Fig. 14 is a diagram illustrating the timing of the various valve events; and

Fig. 15 is a diagram illustrating the relationship of the inlet and exhaust port areas at various positions of crank shaft rotation.

In Fig. 1, an engine incorporating the present invention is illustrated as comprising a cylinder block 10 within which a plurality of working cylinders 11 are provided. Each of the cylinders is provided with a cylindrical sleeve or liner 12 which is rigidly secured to the cylinder block by means of a retainer ring 13 and cap screws 14 as illustrated. One end of each of the cylinders is closed by a junk head 15 disposed within a suitable opening provided in an entablature 16 which is rigidly secured to the cylinder block by means of cap screws 17. Each of the junk heads is provided with an outwardly extending flange 18 rigidly secured to the entablature by means of cap screws 19. A piston 21 is disposed for reciprocation within each of the cylinders and is connected by means of a pin 22 to one end of a connecting rod 23. At its opposite end, the connecting rod is pivotally connected to a crankshaft 24, carried for rotation in the cylinder block.

The piston is provided with a concave crown 25 to accommodate a cooperating protruding deflector 26 formed on the junk head 15. The piston crown and deflector 26 cooperate to produce a desirable turbulence of the air in the combustion chamber during compression, as well as directing the flow of air through the cylinder during the exhaust period in a manner to be presently described. Each of the junk heads is provided with a centrally disposed opening for the reception of a burner tube 27 having a threaded connection therewith. The burner tube is provided with a suitable opening for the reception of a fuel injector 28, rigidly secured to the burner tube by means of a nut 28'. The injector is supplied with fuel from a suitable metering pump (not shown) through a fuel line 29 and is adapted to spray fuel under pressure into a pre-combustion chamber 30, provided in the burner tube, which communicates with the working cylinder by way of an orifice 31.

Air may be supplied to the engine from any suitable blower (not shown) which is adapted to supply air at pressures above atmospheric through a pipe 32 to an air chest 33 provided in the cylinder block. As is best illustrated in Figs. 6 and 7, the cylinder block is provided with a plurality of passages 34 for directing air from the air chest to each of the cylinders. Each of the passages 34 terminates in a port 34', a plurality of which are spaced about the periphery of each of the cylinders. The exhaust gases are forced out of the cylinder through a plurality of spaced ports 37', each of which is associated with an exhaust passage 37 provided in the cylinder block. From the passage 37, the gases are exhausted to the atmosphere through an exhaust manifold 38, rigidly secured to the cylinder block by means of cap screws 39, illustrated in Fig. 1.

The air chest 33 also communicates with an elongated bore 41, extending longitudinally along the cylinder block, by way of spaced apertures 42. The bore also communicates with the engine cylinders through a plurality of inlet passages 43, each of which terminates in an inlet port 43', spaced about the periphery of each of the cylinders. A rotary air valve 46 is disposed within the bore 41 and is adapted for rotation therein from the engine crankshaft through a suitable gear train indicated at 47 in Fig. 1. The air valve 46 is provided with a plurality of spaced cylindrical valve parts 48 adapted to prevent the flow of air from apertures 42 to inlet passages 43. Each of the parts 48 is provided with a suitable relief 49 which at the proper time during rotation of the valve permits communication between the apertures 42 and the inlet passages 43. The valve 46 is also provided with a plurality of cam surfaces 51, one of which is disposed between each of the valve parts 48 and is adapted to engage a roller 52 associated with a fuel pump lifter illustrated at 53 in Fig. 8. The fuel pump lifter may be associated with any conventional reciprocating type fuel pump for supplying fuel to the engine in proper cyclic timing.

Inlet ports 34', 43' and exhaust ports 37' are adapted to be opened and closed by cylindrical valve sleeves 56, one of which is associated with each cylinder. Each sleeve is disposed within the cylinder block 10 and embraces the junk head 15 and is free for reciprocal movement. As is best illustrated in Figs. 3, 4 and 5, each valve sleeve is provided with a pair of diametrically spaced recesses 57 for the reception of roller brackets 58 which are rigidly secured to the sleeves as by rivets 59. Each of the brackets is provided with a suitable opening 61 for the accommodation of a pair of rollers 62 and 63 which are carried for rotation on shafts 64 and 65 respectively, rigidly supported in the brackets 58. The rollers 62 and 63 are interposed between and adapted to engage a pair of cooperating cam surfaces 66 and 67 respectively. The cam surface 66 is formed on a cylindrical cam 68 which is supported for rotation in a bearing 69, rigidly supported in the cylinder block. The cam surface 67 is formed on a similar cam 71, supported for rotation on a bearing 72, rigidly supported in the entablature 16. The periphery of each of the cams 68 and 71 is provided with a ring gear 73 and 74 respectively, formed integrally thereon and in driving mesh with each other and drive gears 76 (see Fig. 2). Gears 76 are driven from the gear train 47 illustrated in Fig. 1. Thus, all of the sleeve valves may be actuated in proper timed relationship with the engine although the cams associated with adjacent cylinders will be rotated in opposite directions.

The cam surfaces 66 and 67 are complementary to each other and upon rotation of the cams impart a reciprocating motion to the valve sleeve 56 associated with each of the cylinders. Each cam surface is provided with a dwell 77 which permits the sleeve to remain stationary during the high cylinder pressure portion of each cycle. The rollers 62 are assembled in intimate contact with the adjacent rollers 63 in such a manner that they roll on each other, as well as the adjacent cam surfaces. By virtue of this construction, a part of the vertical thrust loading acting on each roller is transmitted to the adjacent roller thus equalizing the wear between the rollers and their supporting shafts.

Rotation of the valve sleeve is prevented by a pair of rollers 78 supported for rotation on the extending ends of the shafts 65, supporting the rollers 63. Each of the rollers 78 is received within a recess 79 provided in a bracket 80, rigidly secured to the cylinder block by means of cap screws 81. Hardened tracks 82 are provided on opposite sides of the recesses 79 and are adapted to engage the rollers 78, thus preventing the valve sleeve from rotating as well as guiding it for reciprocation.

In a two cycle engine, it is desirable to open the exhaust ports substantially before opening the inlet ports to permit the working pressure within the cylinder to be reduced sufficiently to prevent the exhaust gases from entering open inlet ports and intermixing with the incoming supply of fresh air. At the same time, it is also desirable to close the exhaust ports prior to closing the inlet ports thereby permitting an increase in the total weight of the charge of fresh air within the cylinder. In order to accomplish this, the air inlet ports illustrated at 43' in Fig. 7 extend downwardly along the cylinder wall farther than do the exhaust ports 37', which in turn extend downwardly along the cylinder wall farther than the inlet ports 34'. Thus when the sleeve valve 56 is actuated, the ports 43' are opened first and then the exhaust ports 37' and inlet ports 34' in sequence. After the ports are opened, they are closed in reverse order. Although the inlet ports 43' are opened first, communication between the cylinder and air chest is prevented by the air valve 46 which is timed to open simultaneously with the inlet ports 34' and remain open until the ports are closed by the sleeve valve 56. Thus the valve ports are in effect opened and closed in the sequence indicated by the valve timing diagram illustrated in Fig. 14.

In operation, after the charge of fuel and air have been ignited forcing the piston downwardly, the valve sleeve 56 is moved upwardly uncovering, first, the inlet ports 43' and then the exhaust ports 37' as illustrated schematically in Fig. 9. During this period, the air valve 46 prevents communication between the air chest and engine cylinder and the exhaust gases are forced outwardly through the ports 37' by the high pressure within the cylinder. This period of time during which the exhaust gases only are expelled is referred to as the blowdown period and is provided to reduce the pressure within the cylinder below that of the air chest before the inlet ports are opened, thereby preventing intermixing of the charge of fresh air in the air chest with the exhaust gases. The relative length of this blow-down period is extended by virtue of a hump 83 provided on each of the cam surfaces 66 and 67 as illustrated in Fig. 3.

As is illustrated in Fig. 10, further movement of the valve sleeve 56 upwardly uncovers the ports 34' and simultaneously the air valve 46 is rotated to a position permitting communication between the air chest 33 and ports 43. The incoming air entering the cylinder through the inlet ports is directed against the deflector 26 formed on the junk head 15 and is deflected downwardly as indicated by the arrows. As is best illustrated in Fig. 6, the inlet passages are arranged in such a manner that the paths of the air streams meet the periphery of the deflector at an angle that is between tangency and a radial path thus deflecting the air toward the side of the cylinder adjacent to the ports 43', as well as downwardly toward the piston. The inlet passages are arranged so that after the air is deflected downwardly, the remaining horizontal component of the velocity of each air stream is reacted by that of an opposing stream. Thus all of the inlet air is directed downwardly along the cylinder wall adjacent to the ports 43' and is deflected by the crown of the piston which directs it up the opposite side of the cylinder forcing the exhaust gases out through the ports 37' as indicated by the arrows in Figs. 10 and 11.

After the sleeve valve 56 reaches the top of its travel and starts closing ports, the path of the air flow is progressively changed providing a sweeping motion across the cylinder until the inlet ports 34' are closed, as is illustrated in Fig. 12. At this time, the air entering through the ports 43' will flow directly across the top of the cylinder as indicated by the arrows completing the sweeping action. After the exhaust ports are closed, as is illustrated in Fig. 13, the inlet ports 47' are left open a period of time permitting an additional supply of air to be forced into the engine cylinder.

At the end of the scavenging cycle, the sleeve is brought to a stop in the fully closed position, shown in Fig. 1, by the dwells 77 on the cams. It remains stationary during the compression, explosion and power portions of the engine cycle. Since the sleeve is stationary during the periods of high pressure within it, it can be made thin enough and fitted closely enough within the bore of block 10 to be sealed tightly against the port openings by the high pressures and still be free to move with a minimum of friction and wear during the low pressure scavenging portion of the engine cycle.

We claim:

In a two cycle engine having a valve sleeve reciprocable to open and close intake and exhaust ports in the cylinder, a deflector extending inwardly of the cylinder head to intercept intake air and direct it downwardly to produce loop scavenging of exhaust gases and means for introducing a final part of said intake air beyond said deflector to produce a final sweeping flow toward the exhaust ports just prior to their closing.

References Cited in the file of this patent

UNITED STATES PATENTS

| | | |
|---|---|---|
| 359,920 | Cornell | Mar. 22, 1887 |
| 1,111,495 | Rhodes | Sept. 22, 1914 |
| 1,152,424 | Lippincott | Sept. 7, 1915 |
| 1,197,412 | Wahlberg | Sept. 5, 1916 |
| 1,279,578 | Osborn | Sept. 24, 1918 |
| 1,461,089 | Hall | July 10, 1923 |
| 1,632,988 | Adams | June 21, 1927 |
| 1,638,288 | Burtnett | Aug. 9, 1927 |
| 1,644,777 | Gehres | Oct. 11, 1927 |
| 1,654,156 | Andersen | Dec. 27, 1927 |
| 1,716,278 | Muller | June 4, 1929 |
| 1,745,493 | Kratzer | Feb. 4, 1930 |
| 1,869,787 | Trumble | Aug. 2, 1932 |

FOREIGN PATENTS

| | | |
|---|---|---|
| 357,519 | Great Britain | 1931 |
| 402,240 | Italy | Feb. 24, 1943 |